US012695259B2

(12) United States Patent (10) Patent No.: US 12,695,259 B2
Forstmeier et al. (45) Date of Patent: Jul. 28, 2026

(54) FRICTION WELDING CONNECTOR AND ITS METHOD OF PRODUCTION

(71) Applicant: Lisa Dräxlmaier GmbH, Vilsbiburg (DE)

(72) Inventors: Christoph Forstmeier, Landshut (DE); Klaus Specht, Geisenhausen (DE); Ludwig Stephan, Mining (AT)

(73) Assignee: LISA DRAXLMAIER GMBH, Vilsbiburg (DE)

( * ) Notice: Subject to any disclaimer, the term of this patent is extended or adjusted under 35 U.S.C. 154(b) by 360 days.

(21) Appl. No.: 17/910,479

(22) PCT Filed: Mar. 8, 2021

(86) PCT No.: PCT/EP2021/055740
    § 371 (c)(1),
    (2) Date: Sep. 9, 2022

(87) PCT Pub. No.: WO2021/180627
    PCT Pub. Date: Sep. 16, 2021

(65) Prior Publication Data
    US 2023/0187887 A1     Jun. 15, 2023

(30) Foreign Application Priority Data

Mar. 10, 2020    (DE) .................... 10 2020 106 415.2

(51) Int. Cl.
    *H01R 43/02*       (2006.01)
    *B23K 20/12*       (2006.01)
    (Continued)

(52) U.S. Cl.
    CPC ......... *H01R 43/0207* (2013.01); *B23K 20/12* (2013.01); *H01R 11/12* (2013.01); *B23K 2101/36* (2018.08); *H01R 2201/26* (2013.01)

(58) Field of Classification Search
    CPC ................ H01R 43/0207; H01R 11/12; H01R 2201/26; B23K 20/12; B23K 2101/36
    See application file for complete search history.

(56) References Cited

U.S. PATENT DOCUMENTS

1,110,475 A * 9/1914 Baier ..................... H01R 11/12
                                                      439/825
3,937,385 A * 2/1976 Asada ................... B21C 23/007
                                                      228/131
(Continued)

FOREIGN PATENT DOCUMENTS

CN         101369688 B      2/2009
CN         20150629254 A    1/2016
                (Continued)

OTHER PUBLICATIONS

CN106825903B English Language Machine Translation.
(Continued)

*Primary Examiner* — Thanh Tam T Le
(74) *Attorney, Agent, or Firm* — BelayIP

(57) ABSTRACT

A method of making an electrical connection is here proposed. The method includes the steps of joining a first contact member to a second contact member in a material-to-material contact. The method steps for the same include:
    providing the first contact part, which towards the second contact part has a male, first joining section as a solid component with an at least substantially rotationally symmetrical profile,
    providing the second contact part having towards the first contact part a female second joining portion with a hollow profile,
    inserting the first joining section into the second joining section, applying a friction welding tool (400) to or in an opening of the second joining section (121), and
                        (Continued)

moving the friction welding tool relative to the first contact part and/or the second contact part to generate welding energy for at least partially plasticizing a part of the first joining portion and/or second joining portion facing the other contact part.

18 Claims, 5 Drawing Sheets

(51) Int. Cl.
H01R 11/12 (2006.01)
B23K 101/36 (2006.01)

(56) References Cited

U.S. PATENT DOCUMENTS

| | | | | |
|---|---|---|---|---|
| 5,288,245 A * | 2/1994 | Piana | .................... | H01R 11/12 439/879 |
| 5,531,618 A * | 7/1996 | Market | .................. | H01R 11/12 439/840 |
| 6,015,953 A * | 1/2000 | Tosaka | .................... | H01R 4/20 174/79 |
| 6,129,568 A * | 10/2000 | Mercurio | .............. | H01R 11/12 439/166 |
| 6,176,716 B1 * | 1/2001 | Mercurio | .............. | H01R 11/12 439/166 |
| 6,538,203 B1 * | 3/2003 | Nolle | ................... | H01R 11/283 174/84 C |
| 6,726,510 B2 * | 4/2004 | Norbert | ................. | H01R 11/12 439/810 |
| 7,947,904 B2 * | 5/2011 | Watanabe | ............. | H01R 4/184 174/72 A |
| 8,066,525 B2 * | 11/2011 | Melni | ................... | H01R 11/12 439/271 |
| 8,777,679 B2 * | 7/2014 | De France | ............ | H02G 7/056 439/879 |
| 9,475,440 B2 * | 10/2016 | Gottschlich | ........... | B23K 20/10 |
| 9,559,443 B2 * | 1/2017 | Boutin | .................... | H01R 11/11 |
| 9,608,427 B2 * | 3/2017 | Fulponi | ................. | H01R 4/183 |
| 9,985,362 B2 * | 5/2018 | Arenburg | ................ | H01R 4/30 |
| 10,128,615 B2 * | 11/2018 | Thomas | .............. | H01R 43/048 |
| 10,326,218 B2 * | 6/2019 | Hirooka | .................. | H01R 4/72 |
| 10,501,029 B2 * | 12/2019 | Nakai | .................... | H01R 11/28 |
| 10,516,220 B2 * | 12/2019 | Harms | ................ | B23K 20/002 |
| 10,765,858 B2 * | 9/2020 | Marshall | ............. | A61N 1/0504 |
| 10,873,171 B2 * | 12/2020 | Forstmeier | ......... | H01R 43/0214 |
| 11,011,902 B2 * | 5/2021 | Specht | .............. | H01R 43/0249 |
| 11,205,860 B2 * | 12/2021 | Scharkowski | ......... | H01R 4/625 |
| 11,394,163 B2 * | 7/2022 | Goetzmann | ............ | H01R 43/16 |
| 11,942,748 B2 * | 3/2024 | Mathews | ................ | H01R 4/02 |
| 2019/0337472 A1 | 11/2019 | Nakai | | |

FOREIGN PATENT DOCUMENTS

| | | |
|---|---|---|
| CN | 201510885934 | 6/2017 |
| DE | 102011017070 A1 | 10/2012 |
| DE | 202015100319 U1 | 4/2015 |
| EP | 0925964 A2 | 6/1999 |
| EP | 3506431 A2 | 7/2019 |
| JP | 2001205475 A | 7/2001 |

OTHER PUBLICATIONS

CN105226479A English Language Machine Translation.
DE202015100319U1 English Language Machine Translation.
DE102011017070A1 English Language Machine Translation.
EP3506431A2 English Language Machine Translation.
CN101369688B English Language Machine Translation.
JP2001205475A English Language Machine Translation.
International Search Report for PCT/EP2021/055740, in English, May 20, 2021.
Written Opinion for PCT/EP2021/055740, in German, May 20, 2021.
Written Opinion for PCT/EP2021/055740, in English, May 20, 2021.

* cited by examiner

100

130, 111, 121

122

140

110

120

100

130, 111, 121    110

122

112

140

120

FRICTION WELDING CONNECTOR AND ITS METHOD OF PRODUCTION

CROSS REFERENCE TO RELATED APPLICATIONS

This application is a national phase application of International Application No.: PCT/EP2021/055740, filed on Mar. 8, 2021, and further claims priority to German patent application 102020106415.2, filed on Mar. 10, 2020, the content of both of which is incorporated herein by reference.

BACKGROUND OF THE INVENTION

Field of the Invention

The present invention relates to a method for making an electrical connection by materially joining, in particular by friction welding or rotational friction welding, two contact parts. Furthermore, the invention relates to an electrical connection arrangement.

Description of Related Art

In automotive engineering, for example, electrical conductors made of aluminum can be used for the purpose of lightweight construction, cost savings, etc. The area of application ranges from on-board power supplies with 12 V, through 48 V, to high-voltage with more than 60 V. The area of application ranges from on-board power supply systems with 12 V and 48 V to high-voltage systems with more than 60 V.

Due to the formation of, for example, a less electrically conductive surface oxide layer and/or a comparatively strong tendency to cold flow of an otherwise good electrically conductive aluminum material, a material different from aluminum, such as copper, brass or stainless steel, is preferably used for contacting the conductor. Copper in particular has comparatively good mechanical properties with a comparatively low contact resistance, making it suitable for contacting electrical conductors.

Due to the different material properties and a risk of corrosion, in particular due to the respective arrangement of the materials to be connected in the electrochemical voltage series, only a few manufacturing processes are suitable for connecting an aluminum-based conductor to a copper-, brass- or stainless steel-based contact part.

BRIEF SUMMARY OF THE INVENTION

An object of the present invention is therefore to provide an alternative way of making an electrical connection in which different materials can also be combined.

This and other objects are solved by the subject matter of the independent claims. Advantageous further embodiments of the invention are indicated in the dependent claims, the description and the accompanying figures.

A first aspect provides a method of making an electrical connection and/or conduction arrangement by joining a first contact member to a second contact member in a material-to-material manner. The method comprises the following steps:

Providing the first contact part, which towards the second contact part has a male, first joining section as a solid component with an at least substantially rotationally symmetrical profile;

Providing the second contact member having toward the first contact member a female, second joining portion having a hollow profile;

Insertion of the first joining section into the second joining section;

Applying a friction welding tool to or in an opening of the second joining section; and Moving the friction welding tool relative to the first contact part and/or the second contact part to generate welding energy for at least partially plasticizing a part of the first joining section and/or second joining section facing the other contact part.

The material-to-material joining using a friction welding tool can be understood in particular as joining by means of a friction welding process, e.g. rotational friction welding. In this context, the term solid component may be understood to mean that it is not a stranded conductor, but preferably that a solid material is used. The first contact part or a part thereof may simultaneously form a solid conductor of the electrical connection. The solid component may have, for example, a cylindrical shape. The female second joining section can be a kind of sleeve, which can also be open on both sides, in order to be able to insert the male profile through a first opening from one side, while the friction welding tool, for example in the form of a mandrel, can be applied or inserted from the other, opposite side at a second opening.

This process enables a wide variety of combinations of different materials, in particular due to the cohesive joining by means of a friction welding process, which can, for example, break up oxide layers and prevent their reformation.

According to a further embodiment, a material of the first contact part may have a lower mechanical strength or lower yield point than a material of the second contact part. In other words, the material of the first contact part may be softer than the material of the second contact part. For example, the material of the first contact part may be an aluminum material, such as pure aluminum or an aluminum alloy. For example, the material of the second contact part may be a copper material or alloy, brass, or stainless steel.

In a further development, the first contact part can be provided with at least one material recess formed in the first joining section. By material recess can be understood here also a material removal or the like. The material recess can be used to locally weaken the solid component in order, for example, to enable better formability, pressing, etc. by pressing the first and second joining sections prior to friction welding. If, for example, the ductility or flowability of the first joining section is not sufficient or not sufficient alone, the material recess can be provided for e.g. improved pressing of the hollow section onto the solid component.

According to a further development, the at least one material recess can be formed by a machining manufacturing process. For example, this can be done by drilling, cutting, milling, etc. In this way, the first contact part can be provided with the material recess in a simple manner.

In a further embodiment, the material recess may extend along an axis of rotation of the first joining section. In the case of a cylinder shape, for example, the material recess can extend along the longitudinal axis of the cylinder. A plurality of material recesses, preferably extending parallel to each other, may also be provided. Preferably, the material recess can extend over the first joining section, which can simultaneously correspond to a pressing section. In this way, improved pressability can be achieved.

According to a further development, the material recess can be arranged on a lateral surface of the first joining section. For example, the material recess can be designed as a type of notch, as a radially extending bore or the like. This is particularly easy to manufacture.

In a further development, the first contact part and/or the second contact part can have an electrical connection section additional to the joining section for attaching a further contact partner or contact part. The connection section can be selected, for example, from: a contact tongue or contact blade, contact housing, welding surface, screw lug, screw bolt and plug-in element. This provides a wide range of possible applications.

According to a further development, the method may further comprise the step of attaching at least one further contact partner to an electrical connection portion of the first and/or second contact part.

In a further embodiment, the method may further comprise the step of applying a pressing force to the first joining portion and the second joining portion to press them together, after inserting the first joining portion into the second joining portion.

According to a further embodiment, the method may further comprise the step of encasing the first and/or second joining portion, after plasticizing or melting thereof, with an insulating material.

A second aspect provides an electrical connection arrangement that can preferably be made using a method according to the first aspect. The electrical connection arrangement comprises:

a first contact part having a male, first joining section formed as a solid component with an at least substantially rotationally symmetrical profile, a second contact member having a female, second joining portion with a hollow profile, and wherein the first joining section is arranged in the second joining section and is materially connected thereto.

Further features, advantages and possible applications of the invention will be apparent from the following description of advantageous embodiments and the accompanying figures.

BRIEF DESCRIPTION OF THE SEVERAL VIEWS OF THE DRAWINGS

Further advantages, features, and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, without departing from the scope of the disclosure. An advantageous embodiment of the present invention is set out below with reference to the accompanying figures, wherein.

The figures are merely schematic representations and serve only to explain the invention. Identical or similarly acting elements are marked throughout with the same reference signs.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figure 1:
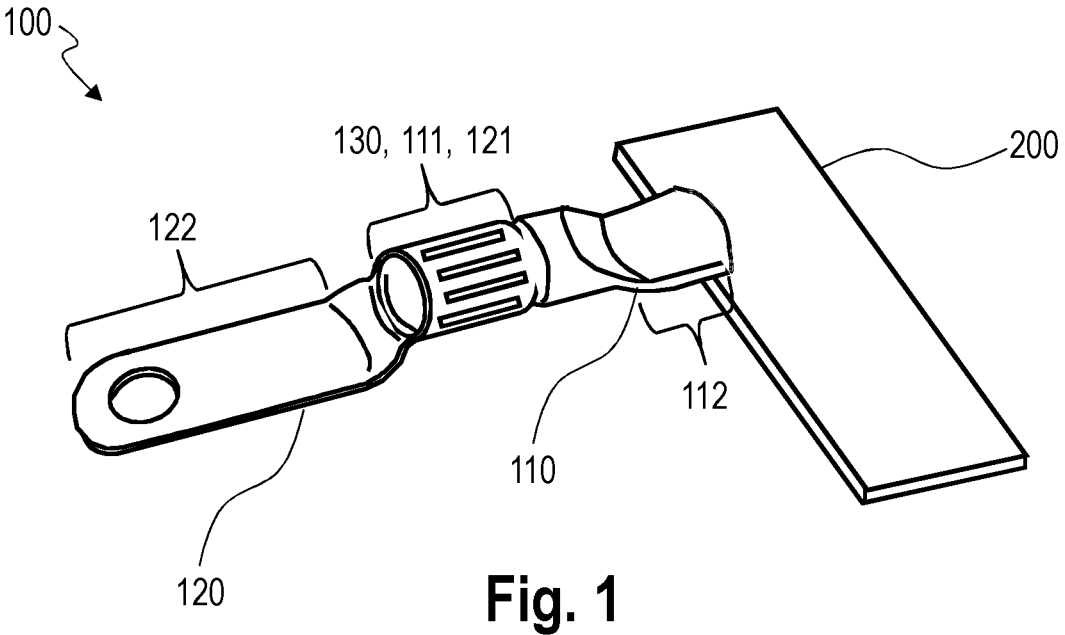
FIG. 1 depicts a perspective view of an electrical connection arrangement according to one embodiment of the invention.

FIG. 1 shows a perspective view of an electrical connection arrangement 100 which is particularly suitable for use in a motor vehicle. The line arrangement 100 has a first contact part 110 and a second contact part 120, which in turn can each be connected to one or more electrical contact partners. For better illustration, the first contact part 110 is here connected to a contact partner 200, which is here exemplarily a type of bus bar. That is, the first contact part 110 is connected on the one hand to the second contact part 120 and on the other hand to the contact partner 200, so that a continuous current path can be formed between a plurality of contact partners via the line arrangement 100. FIG. 1 shows that the second contact part 120 can also be connected to a further contact partner (not shown here).

The first contact part 110 and the second contact part 120 are made of materials that are different from each other, with the second contact part 120 being mechanically stronger than the first contact part 110. Similarly, the first contact part 110 may have a higher ductility than the second contact part 120. In particular, the first contact part 110 may be made of an aluminum material, for example. The second contact part 120 may be made of a copper or steel material, for example.

According to FIG. 1, the first contact part 110 and the second contact part 120 are connected to each other in a section 130, forming a material bond. In section 130, the first contact part 110 and the second contact part 120 may also be pressed together. The first contact part 110 has a male first joining section 111, which is formed as a solid component, for example a solid material, and has a rotationally symmetrical profile, which in this example has a cylindrical shape. The second contact part 120 has a female second joining section 121 which is complementary to the first joining section and is accordingly formed as a hollow profile for receiving the first joining section. The second joining section can therefore also be understood as a type of sleeve.

The first contact part 110 and the second contact part 120 each have an electrical connection section 112 and 122, respectively, additional to the joining section 111 and 121, respectively, for attaching a further contact partner, such as here the contact partner 200. The first connection section 112 of the first contact part 110 is here exemplarily designed as a welding lug, but may also be designed as a screw lug, etc. The second connection section 122 of the first contact part 110 is here exemplarily formed as a screw tab, but may also be formed as a weld tab, etc. According to FIG. 1, the first contact part 110 and/or the second contact part 120 may have a bend formed between the respective joining section 111, 121 and the respective connection section 112, 122. Alternatively or in addition thereto, the respective joining portion 111, 121 and the respective connection portion 112, 122 may be rotated relative to each other, in particular about their longitudinal axis.

Figure 2:
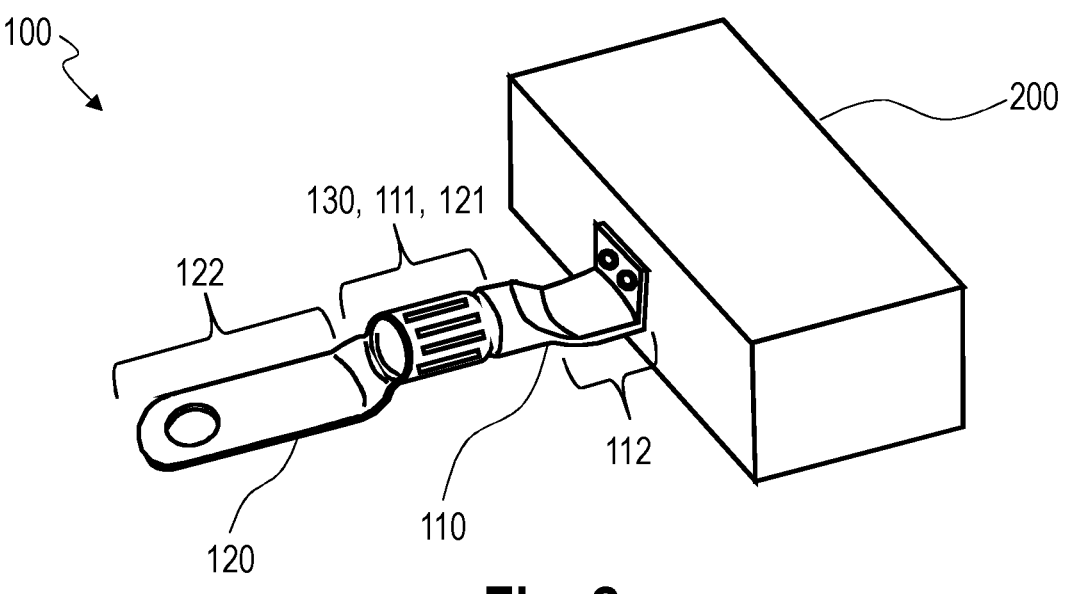
FIG. 2 depicts a perspective view of an electrical connection arrangement according to one embodiment of the invention.

FIG. 2 shows a further exemplary embodiment of the line arrangement 100, wherein here the first contact part 110 has a different connection section 112. In contrast to the embodiment described above, the connection section 112 is not designed as a welded tab here, but is suitable for connection by means of a positive and/or non-positive connection, for example for a tox connection.

Figure 3:
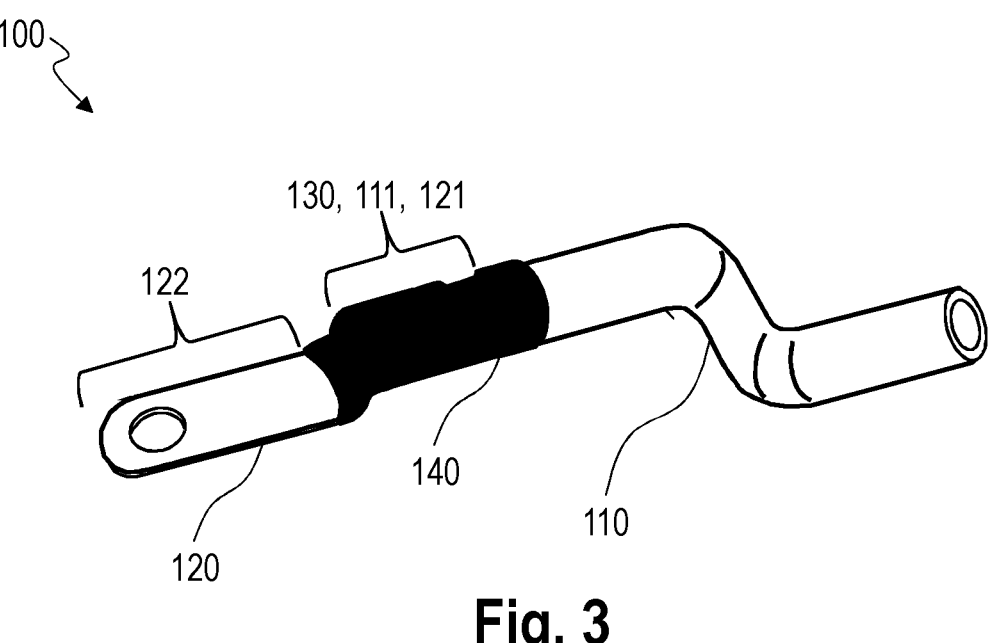
FIG. 3 depicts a perspective view of an electrical connection arrangement with insulation according to one embodiment of the invention.
Figure 4:
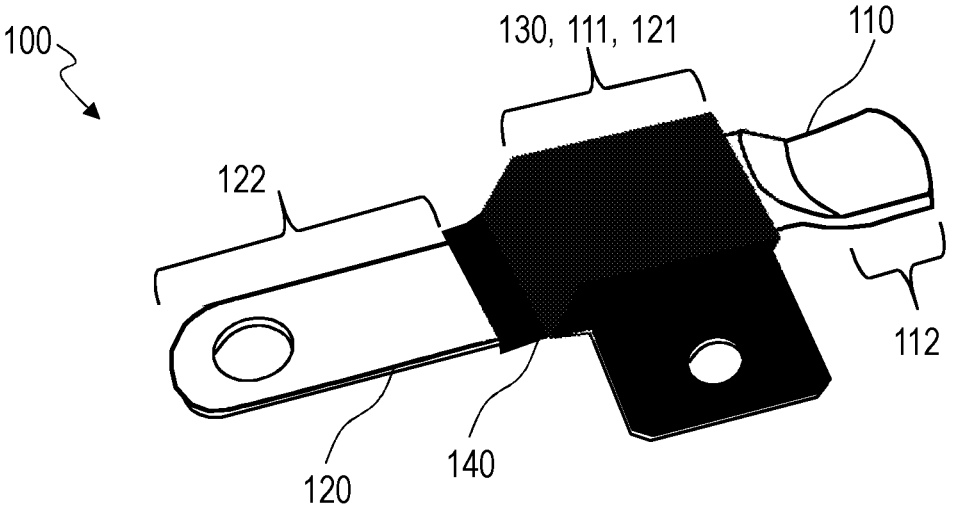
FIG. 4 depicts a perspective view of an electrical connection arrangement with insulation according to one embodiment of the invention.

In FIGS. 3 and 4, the conduit arrangement 100 is in each case sheathed with an insulating material 140, which is at least electrically insulating, but may also have a sealing function.

Figure 5A:
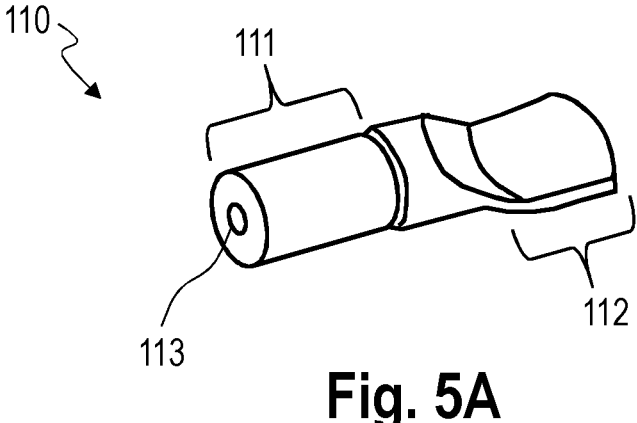
FIG. 5 depicts in each case a perspective view of different first contact parts with a material recess according to embodiments of the invention.
Figure 5B:
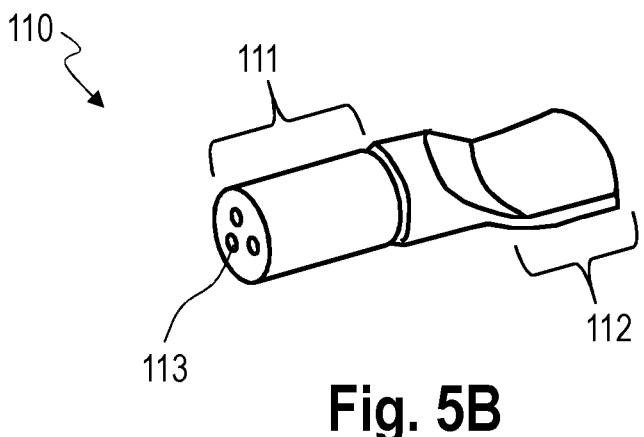
Figure 5C:
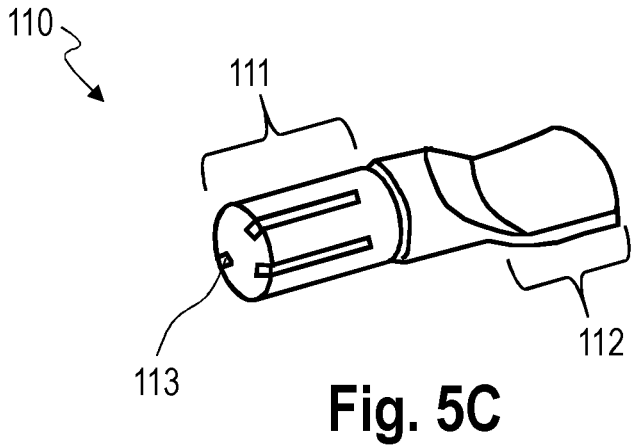

FIG. 5 comprises three partial FIGS. 5A, 5B and 5C, each showing the first contact part 110 as a single component. Common to these three exemplary embodiments is that the first joining portion 111 has a material recess 113. This is formed, for example, by a machining manufacturing process, such as drilling, milling or the like. In FIG. 5A, the first joining section 111 has as material recess 113, by way of example, a central bore, which is formed here as a blind hole, which extends at least in sections along a longitudinal extent or an axis of rotation of the first joining section 111. In FIG. 5B, as an example, three holes are provided as material recess 113, which may, for example, have a smaller cross-section than the central hole of FIG. 5A. In FIG. 5C, a number of material recesses 113 are provided, which are formed on an outer surface of the first joining section 111.

Figure 6:
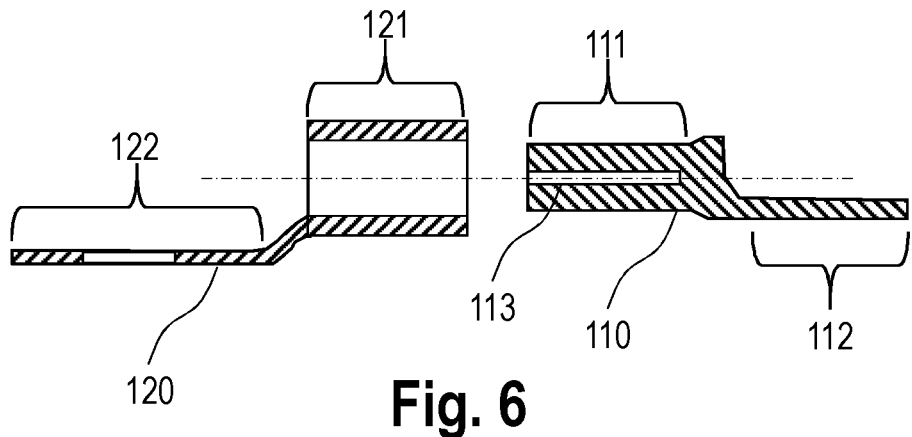
FIG. 6 depicts a sectional view of a first and a second contact part according to an embodiment of the invention before a joining process.
Figure 7:
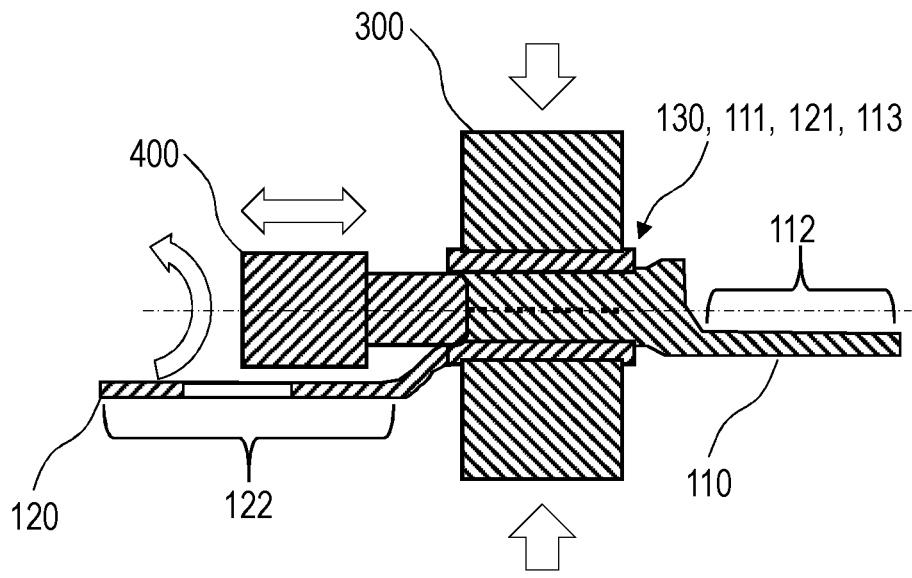
FIG. 7 depicts a sectional view of a first and a second contact part according to an embodiment of the invention during a friction welding process.
Figure 8:
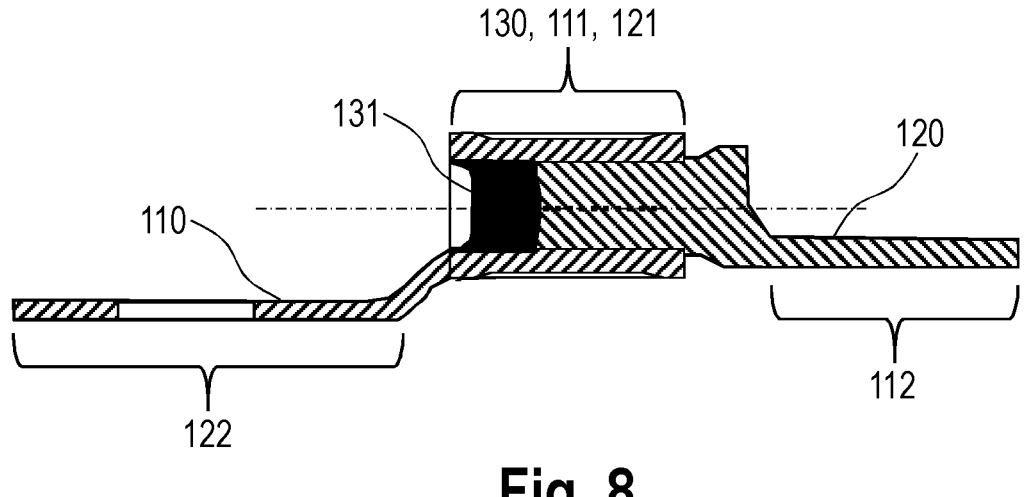
FIG. 8 depicts a sectional view of a first and a second contact part according to an embodiment of the invention after a joining process.

Referring now to FIGS. 6, 7, and 8, a method of fabricating the electrical lead assembly 100 by joining the first contact member 110 to the second contact member 120 will be explained below.

First, as indicated in FIG. 6, the two contact parts 110, 120 are inserted into each other by inserting the first joining section 111 into the second joining section 121.

As indicated in FIG. 7, in an optional step a pressing tool 300 is applied to the outside of section 130 from the radial direction and a pressing force F is applied to it, as indicated by two arrows in FIG. 7. In this process, a deformation of the first joining section 111 can be favored by the material recess 113 (see also FIGS. 5 and 6).

Referring further to FIG. 7, a friction welding tool 400 is then moved to the section 130, as indicated by a double arrow. The friction welding tool is here a kind of mandrel which can be moved, for example, but also turned or rotated. For example, the friction welding tool 400 is guided at or partially into the second joining area 121, which is open on both sides for this purpose, so that the first contact part 110 can be approached from a first side and the friction welding tool 400 from a second side. The friction welding tool 400 is then moved, in particular rotated or rotated, relative to the first contact part 110 and/or the second contact part 120 for generating welding energy, for at least partially plasticizing a part of the first joining section 111 and/or second joining section 121 facing the other contact part.

FIG. 8 shows a sectional view of the finished connection arrangement 110. A welded joint 131 is now formed in section 130.

In a further optional step, the insulation material 140 (see FIGS. 3 and 4) can then be applied in the section 130, possibly also with an overlap with another section, for example by overmolding with a suitable plastic, or by a similar manufacturing process.

Finally, the interconnect assembly 100 may be connected to the one or more contact partners 200, for example, by bolting, welding, toxing, etc., as appropriate.

Since the devices and methods described in detail above are examples of embodiments, they can be modified to a wide extent by the skilled person in the usual manner without leaving the scope of the invention. In particular, the mechanical arrangements and the proportions of the individual elements with respect to each other are merely exemplary. Some preferred embodiments of apparatus according to the invention have been disclosed above. The invention is not limited to the solutions explained above, but the innovative solutions can be applied in different ways within the limits set by the claims.

The invention claimed is:

1. A method for making an electrical connection by joining a first contact part to a second contact part in a material-to-material contact, the method comprising the steps of:

providing the first contact part comprising a male first joining section arranged towards the second contact part and being a solid, substantially cylindrical post defining the first joining section;

providing the second contact part comprising a female second joining section arranged towards the first contact part and comprising a hollow profile, the female second joining section comprising an interior surface;

inserting the first joining section into the second joining section, inserting a rotating friction welding tool through an opening at a distal end of the female second joining section, opposite the end at which the male first joining section is inserted, and bringing the tool into contact with an interior surface of the female second joining section while the male first joining section remains fitted in the female second joining section, thereby forming an internal annular weld interface between the solid male first joining section and the surrounding female second joining section;

moving the friction welding tool relative to at least one of the first contact part and the second contact part so as to generate welding energy for at least partially plasticizing at least one of a part of the first joining section and the second joining section facing an other contact part;

wherein a material of the first contact part has a lower mechanical strength or lower yield point than a material of the second contact part;

wherein the first contact part comprises aluminum or aluminum alloy, and the second contact part comprises copper, copper alloy, brass, or stainless steel; and wherein the friction welding generates sufficient heat and relative mechanical displacement at said internal annular interface to disrupt aluminum oxide on the first joining section and to prevent reformation during bonding to the copper-containing second joining section.

2. The method according to claim 1, wherein the first contact part comprises at least one material recess formed in the first joining section.

3. The method according to claim 2, wherein the material recess extends along an axis of rotation of the first joining section.

4. The method according to claim 2, wherein the material recess is arranged on a lateral surface of the first joining section.

5. The method according to claim 1, wherein the at least one material recess is formed by a machining manufacturing process.

6. The method according to claim 1, wherein at least one of the first contact part and the second contact part comprises an electrical connection section in addition to the joining section and is configured to attach a further contact partner or contact part.

7. The method according to claim 1, further comprising the step of: attaching at least one further contact partner to an electrical connection section of at least one of the first contact part and second contact part.

8. The method according to claim 1, further comprising the step of: coating at least one of the first joining section and second joining section with an insulating material after melting of the same.

9. The method according to claim 1, wherein:

wherein the friction welding tool is inserted into an internal cavity of the second contact part and brought into contact with an interior wall thereof to generate welding energy sufficient to disrupt on the first contact part during joining.

10. An electrical connection assembly, comprising:

a first contact part comprising a solid, substantially cylindrical male first joining section;

a second contact part comprising a female second joining section having a hollow profile within an interior surface and an opening at a distal end, the male first joining section being received within the hollow sleeve profile; a metallurgical joint formed at an internal angular interface between the male first joining section and the surrounding female second joining section, the internal annular interface being located adjacent the interior surface and accessible via said distal opening;

wherein a material of the first contact part has a lower mechanical strength or lower yield point than a material of the second contact part;

wherein the first contact part comprises aluminum or aluminum alloy, and the second contact part comprises copper, a copper alloy, brass, or stainless steel, and wherein the assembly is configured such that the metallurgical joint is producible by applying a friction welding tool through the distal opening into contact with the interior surface to generate welding energy sufficient to disrupt aluminum oxide and prevent its reformation during bonding to the copper-containing second joining section.

11. The electrical connection assembly according to claim 10, wherein the first contact part comprises at least one material recess formed in the first joining section, the material recess comprising an axial blind hore and/or a lateral recess configured to facilitate radial pressing and material flow during interior friction welding.

12. The electrical connection assembly according to claim 10, wherein an at least one material recess is formed by a machining manufacturing process.

13. The electrical connection assembly according to claim 12, wherein the material recess extends along an axis of rotation of the first joining section.

14. The electrical connection assembly according to claim 12, wherein the material recess is arranged on a lateral surface of the first joining section.

15. The electrical connection assembly according to claim 10, wherein at least one of the first contact part and the second contact part comprises an electrical connection section in addition to the joining section and is configured to attach a further contact partner or contact part.

16. The electrical connection assembly according to claim 10, further comprising at least one further contact partner configured to be attached to an electrical connection section of at least one of the first contact part and second contact part.

17. The electrical connection assembly according to claim 10, further comprising and insulating material coating at least one of the first joining section and second joining section with an insulating material after melting of the same.

18. The electrical connection according to claim 10, wherein the first joining section is joined to the second joining section by friction welding from within the second joining section via a tool engaging an internal surface of the second joining section.

* * * * *